(12) United States Patent
Kalemba et al.

(10) Patent No.: US 7,364,423 B2
(45) Date of Patent: Apr. 29, 2008

(54) ARTICLE MOVING APPARATUS CONFIGURED FOR A MOLDING MACHINE

(75) Inventors: Jacek Kalemba, Oakville (CA); Muhammad Zeeshan Anwar, Brampton (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 246 days.

(21) Appl. No.: 11/136,067

(22) Filed: May 24, 2005

(65) Prior Publication Data
US 2006/0269650 A1    Nov. 30, 2006

(51) Int. Cl.
*B29C 45/42* (2006.01)

(52) U.S. Cl. .................... 425/556; 425/444
(58) Field of Classification Search ............ 425/444, 425/556, 436 RM; 901/50
See application file for complete search history.

(56) References Cited

U.S. PATENT DOCUMENTS

| | | | |
|---|---|---|---|
| 3,804,568 A * | 4/1974 | Rees ........................... | 425/139 |
| 3,981,667 A | 9/1976 | Bilodeau | |
| 4,050,870 A | 9/1977 | Frigo | |
| 4,221,532 A | 9/1980 | Vance | |
| 4,368,018 A | 1/1983 | Rees et al. | |
| 4,589,840 A | 5/1986 | Schad | |
| 4,737,099 A | 4/1988 | Kaminski | |
| 4,787,841 A * | 11/1988 | Simon ........................ | 425/556 |
| 4,822,233 A | 4/1989 | Hansel | |
| 4,880,368 A | 11/1989 | Hasl et al. | |
| 5,037,597 A | 8/1991 | McGinley et al. | |
| 5,334,009 A | 8/1994 | Urbanek et al. | |
| 5,374,177 A | 12/1994 | Hehl | |
| 5,490,772 A | 2/1996 | Gaigl | |
| 5,527,173 A | 6/1996 | Miller et al. | |
| 5,527,174 A | 6/1996 | Godin et al. | |
| 5,629,031 A | 5/1997 | Ishikawa et al. | |
| 5,891,378 A | 4/1999 | Herbst | |
| 6,054,075 A | 4/2000 | Inaba et al. | |
| 6,062,798 A | 5/2000 | Muka | |
| 6,390,804 B1 * | 5/2002 | Akino et al. ................. | 425/556 |
| 6,416,706 B1 | 7/2002 | Fisher et al. | |
| 6,464,483 B1 | 10/2002 | Lichtinger | |
| 6,516,866 B1 * | 2/2003 | Jones ........................ | 164/132 |
| 6,530,766 B1 | 3/2003 | DeGraaff | |

(Continued)

FOREIGN PATENT DOCUMENTS

DE    2414741 A1    10/1975

(Continued)

OTHER PUBLICATIONS

International Search Report for PCT/CA2006/000709, dated Aug. 21, 2006, 3 pages, related to the above-identified US patent application.

*Primary Examiner*—Yogendra N. Gupta
*Assistant Examiner*—Emmanuel S Luk

(57) ABSTRACT

Disclosed is an article moving apparatus configured to move an article relative to a first mold half and a second mold half of a molding machine. The article moving apparatus includes an arm configured to grasp and release the article, and also include an arm reciprocating structure configured to reciprocate the arm between an in-mold position and an out-mold position relative to the first mold half and the second mold half, and to be selectively retractable away from an abutment relationship relative to any one of the first mold half and the second mold half.

35 Claims, 6 Drawing Sheets

U.S. PATENT DOCUMENTS

| | | |
|---|---|---|
| 6,837,701 B2 | 1/2005 | Becker et al. |
| 2002/0086085 A1* | 7/2002 | Takayama et al. .......... 425/556 |
| 2004/0105909 A1 | 6/2004 | Tofukuji et al. |
| 2004/0119206 A1 | 6/2004 | Howlett |
| 2004/0197438 A1 | 10/2004 | Geissler et al. |

FOREIGN PATENT DOCUMENTS

| | | |
|---|---|---|
| EP | 0249669 B1 | 1/1991 |
| EP | 0373023 B1 | 2/1992 |
| EP | 0415153 B1 | 11/1999 |
| JP | 62-085919 A | 4/1987 |
| JP | 62-134233 A | 6/1987 |
| JP | 1-105719 A | 4/1989 |
| JP | 3-34811 A | 2/1991 |
| WO | WO 99/01055 A1 | 1/1999 |
| WO | WO 01/38064 A1 | 5/2001 |
| WO | WO 01/60579 A1 | 8/2001 |

* cited by examiner

ARTICLE MOVING APPARATUS CONFIGURED FOR A MOLDING MACHINE

FIELD OF THE INVENTION

The present invention generally relates to molding machines, and more specifically, the present invention relates to an article moving apparatus configured for molding machines, and molding machines that include same.

BACKGROUND

U.S. Pat. No. 4,368,018 (hereinafter referred to as the '018; Inventors: Rees, et al; Assignee: Husky Injection Molding Systems Ltd.) discloses a transporter for transporting articles or inserts in connection with a molding machine. Inadvertently during normal operation, a molded article may become jammed within a mold, and/or may not cooperate with a material pick-up head of the transporter. A molding machine operator must then manually retrieve the molded article jammed in the mold. On occasion, the operator would have to detach (that is, mechanically disengage) the transporter from the mold, and then separate the mold in order to gain access to the jammed molded article. Disadvantageously, time taken to disconnect and reconnect the transporter may undesirably increase the downtime of the molding machine and thereby lower throughput efficiency (that is, the number of parts molded per minute).

U.S. Pat. No. 5,037,597 (hereinafter referred to as the '597; Inventors: McGinley et al; Assignee: Husky Injection Molding Systems Ltd.) discloses a swing chute system for removing articles from a mold. The swing chute cannot be moved in and out of the mold until the mold has been sufficiently translated apart. Disadvantageously, when the article becomes jammed within the mold, the operator would have to detach the swing chute from the mold and/or molding machine in order to retrieve the jammed molded article.

U.S. Pat. No. 4,589,840 (hereinafter referred to as the '840; Inventor: Schad; Assignee: Husky Injection Molding Systems Ltd.) discloses side chutes that are linearly translatable into and out of a mold area and are configured to pick up and remove ejected molded articles away from a mold. An operator may selectively move the side chutes over to areas outside of both sides of the mold. Disadvantageously, floor space that is taken up by the chutes moving over to these areas will reduce the amount of available floor space that could have been assigned to other production equipment.

SUMMARY

According to first aspect of the present invention, there is provided an article moving apparatus configured to move an article relative to a first mold half and a second mold half of a molding machine, the article moving apparatus including an arm configured to grasp and release the article, and an arm reciprocating structure configured to reciprocate the arm between an in-mold position and an out-mold position relative to the first mold half and the second mold half, and to be selectively retractable away from an abutment relationship relative to any one of the first mold half and the second mold half.

According to a second aspect of the present invention, there is provided a molding machine, including a first mold half, a second mold half configured to cooperate with the first mold half, and an article moving apparatus configured to move an article relative to the first mold half and the second mold half, including an arm configured to grasp and release the article, and an arm reciprocating structure configured to reciprocate the arm between an in-mold position and an out-mold position relative to the first mold half and the second mold half, and to be selectively retractable away from an abutment relationship relative to any one of the first mold half and the second mold half.

A technical effect realized by the first and the second aspects of the present invention is that less floor space is used up by the article moving apparatus so that more factory equipment may be installed onto a factory floor.

Another technical effect realized by the first and the second aspects of the present invention is that the article moving apparatus is easier to manipulate when managing jammed articles.

BRIEF DESCRIPTION OF THE DRAWINGS

Exemplary embodiments of the present invention will be described with reference to the following Figures and the detailed description, in which.

DETAILED DESCRIPTION OF THE EXEMPLARY EMBODIMENTS

Figure 1:
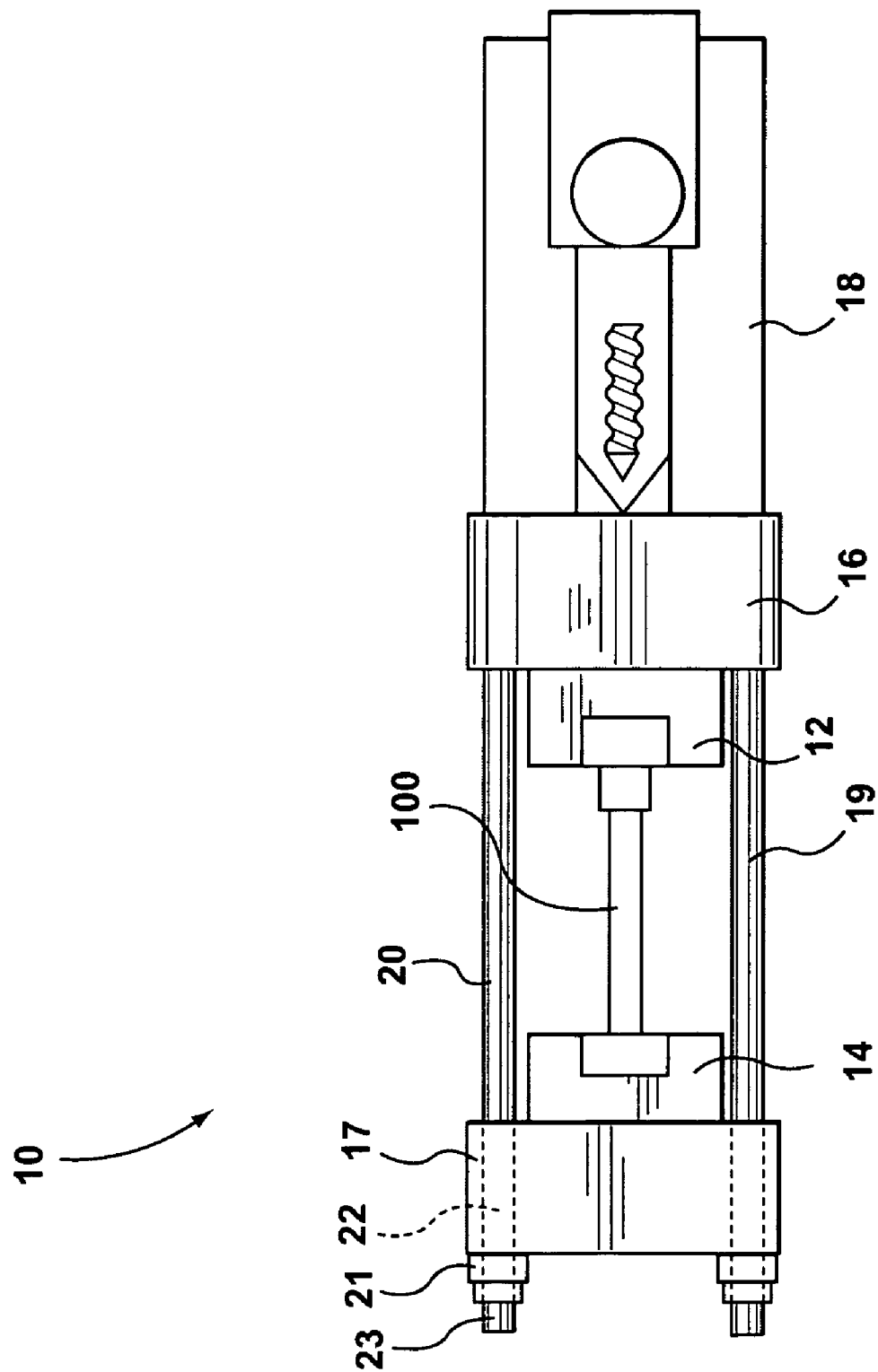
FIG. 1 is a top view of an Article Moving Apparatus (AMA) in combination with a molding machine.

FIG. 1 is the top view of the Article Moving Apparatus (AMA) 100 in combination with a molding machine 10. The AMA 100 is configured to move an article, which was molded by the mold halves 12, 14, away from the mold halves 12, 14 and/or the AMA 100 is configured to move and place a mold insert within the mold halves 12, 14 prior to molding a new article. The molding machine 10 is shown as an injection molding machine. The molding machine 10 is configured to support the AMA 100 relative to the mold halves 12, 14, or alternatively another structure (not depicted) is configured to support the AMA 100 relative to the mold halves 12, 14. During each injection cycle, the molding machine 10 molds articles corresponding to a mold cavity or mold cavities defined by complementary mold halves 12, 14 located within the machine 10. The complementary mold half 12 is also referred to as a stationary mold half, and the complementary mold half 14 is also known as a moving mold half. The machine 10 includes, without specific limitation, a stationary platen 16, a movable platen 17 as well as an injection unit 18 for plasticizing and injecting a molding material into the mold cavities. In operation, the movable platen 17 is moved relative to the stationary platen 16 by means of stroke cylinders (not shown) or the like. A clamp force is developed in the machine 10, as will readily be appreciated, through the use of tie bars 19, 20 and a tie-bar clamping mechanism 21. The clamping mechanism 21 is (generally) fixedly attached to the moving platen 17. The clamping mechanism 21 extends at least partially into a corresponding bore 22 that extends through the moving platen 17 at the corners thereof. It is usual that a floating end 23 of the tie-bar 19, 20 is free to move relative to the moving platen 17, with the other remote end anchored into the stationary platen 16.

Figure 2:
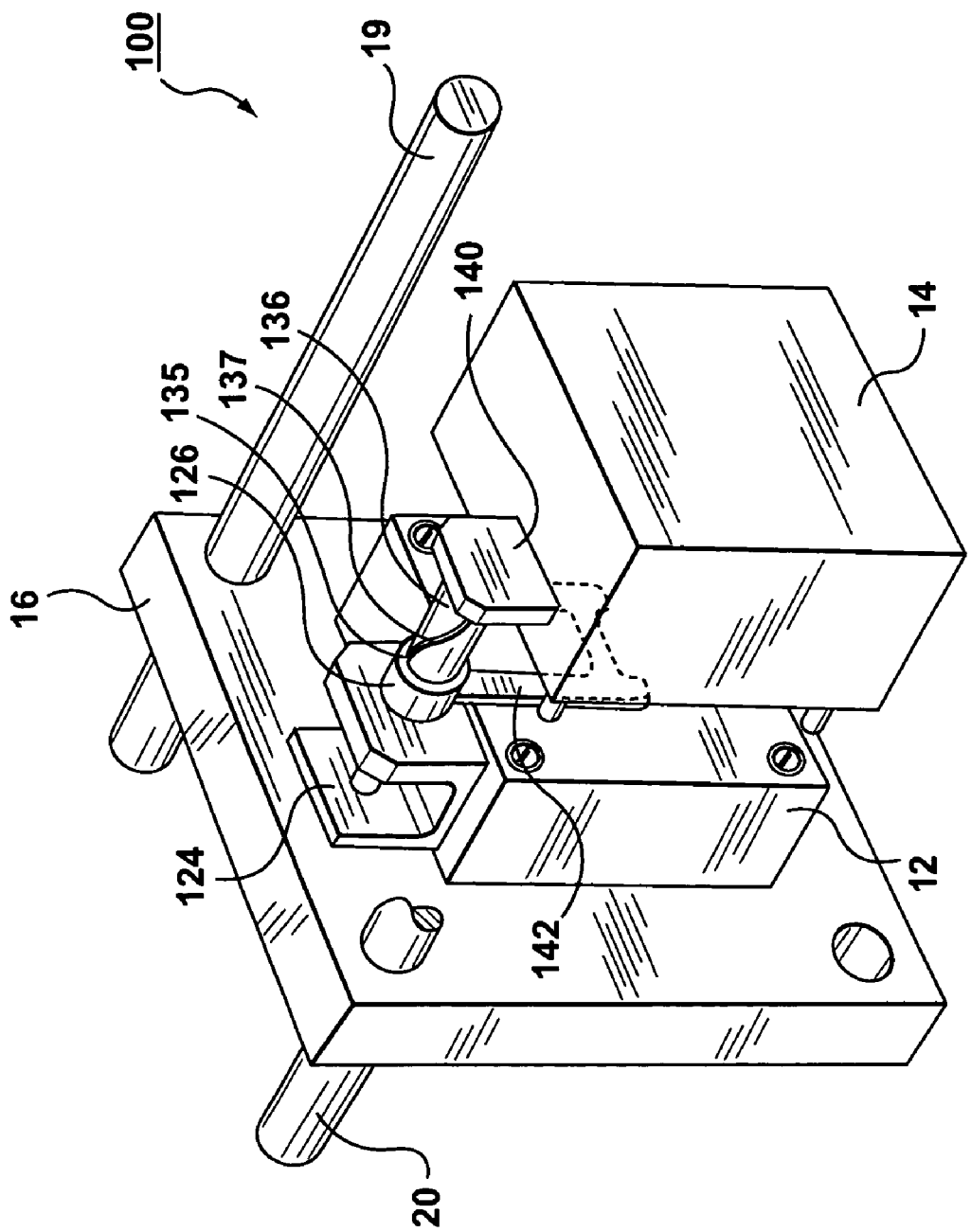
FIG. 2 is a perspective view of the AMA of FIG. 1 in an in-mold position.

FIG. 2 is the perspective view of the AMA 100 of FIG. 1 in an in-mold position. The moving platen 17 has been removed from this perspective view to improve the view of the AMA 100. In the in-mold position, the mold halves 12, 14 are spread apart from each other.

Generally, the AMA 100 includes an arm 142 which is configured to grasp and release an article by using, for example, suction cups attached to vacuum tubing which is in turn attached to a vacuum generator.

The AMA 100 also includes an arm reciprocating structure 126, 135, 136, 137 configured to reciprocate the arm 142 between the in-mold position and an out-mold position relative to the mold 12, 14 along a direction perpendicular to a clamp axis of the machine 10. The arm reciprocating structure 126, 135, 136, 137 is configured to normally abut against, and to selectively retract away from, any one of the mold halves 12, 14 along the clamp axis of the machine 10. The arm reciprocating structure 126, 135, 136, 137 is itself aligned along the clamp axis, and is optionally configured to substantially operate within a footprint of the mold 12, 14.

A frame 124 and a frame 140 are attached to and extend from the stationary mold half 12 and the moving mold half 14 respectively. In alternative embodiments (not depicted), the frame 124 is not included and the stationary platen 16 acts as a replacement for the frame 124 or the frame 124 extends from the platen 16. Alternatively, the frame 140 is not included and the moving platen 17 acts as a replacement for the frame 140 or the frame 140 extends form the platen 17.

The AMA 100 includes a cylinder 136 that cooperates with the frame 124, and is biased to resiliently urge against the frame 140. The cylinder 136 is not positively attached or connected to the frame 140 but it normally abuts the frame 140 and is selectively retractable away from the frame 140. In an alternative embodiment (not depicted), the cylinder 136 cooperates with the frame 124 in the manner that it cooperates with the frame 140.

The AMA 100 includes a sleeve 126 that is rotatably mounted to the frame 124. The sleeve 126 is configured to rotate in response to a relative translational motion between the cylinder 136 and the sleeve 126 upon the mold halves 12, 14 opening and closing relative to each other. In alternative arrangements, the sleeve 126 is rotatably mounted to the frame 140. A sleeve bearing (not depicted) is placed between the frame 124 and the sleeve 126, which allows the sleeve 126 to be rotatably mounted to the frame 124. The cylinder 136 fits within the sleeve 126 and slides non-rotationally relative to the sleeve 126. In other alternative arrangements, the frames 124, 140 are not included with the AMA 100 but are supplied separately.

The arm 142 is attached to and extends from the sleeve 126. The arm 142 is configured to grasp and release the article. The arm 142 is rotatably moved in response to a rotational movement of the sleeve 126. The cylinder 136 provides an outer-facing circumferential surface that defines a pathway groove 137 thereon that wraps around the outer-facing circumferential surface at least in part. A pathway follower 135 depends from the sleeve 126 and also fits into the groove 137. The groove 137 and the groove follower 135 combine to operate as a motion converter that converts a relative translational motion between the cylinder 136 and the sleeve 126 into a rotational motion of the sleeve 126. When the arm 142 is moved into and out from the in-mold position, the cylinder 136 is biased to extend and remain in abutting relationship with the frame 140. In other arrangements, the cylinder 136 retractably abuts against any one of the stationary mold half 12 and/or the moving mold half 14, and/or the sleeve 126 is rotatably mounted to which ever of the stationary mold half 12 and the moving mold half 14 that does not abut against the cylinder 136.

In operation, when the mold halves 12, 14 are translated apart from each other, the cylinder 136 is urged to translate away from the frame 124 while remaining continually abutting against the frame 140. In response, the follower 135 follows the curved groove 137, and the sleeve 126 rotates. As the sleeve 126 rotates, the arm 142 will then rotatably move from the out-mold position to the in-mold position.

One technical effect of the AMA 100 is the operator may avoid wasting time on mechanically disconnecting the cylinder 136 from the mold half 14 in the event that the operator must access an article jammed in the mold halves 12, 14 because the cylinder 136 may be easily retracted away from the moving mold half 14. Another technical effect is that the AMA 100 may remain substantially within an envelope, or a footprint, of the molding machine 10, which helps to permit adding more factory equipment onto a limited factory floor space.

Figure 3:
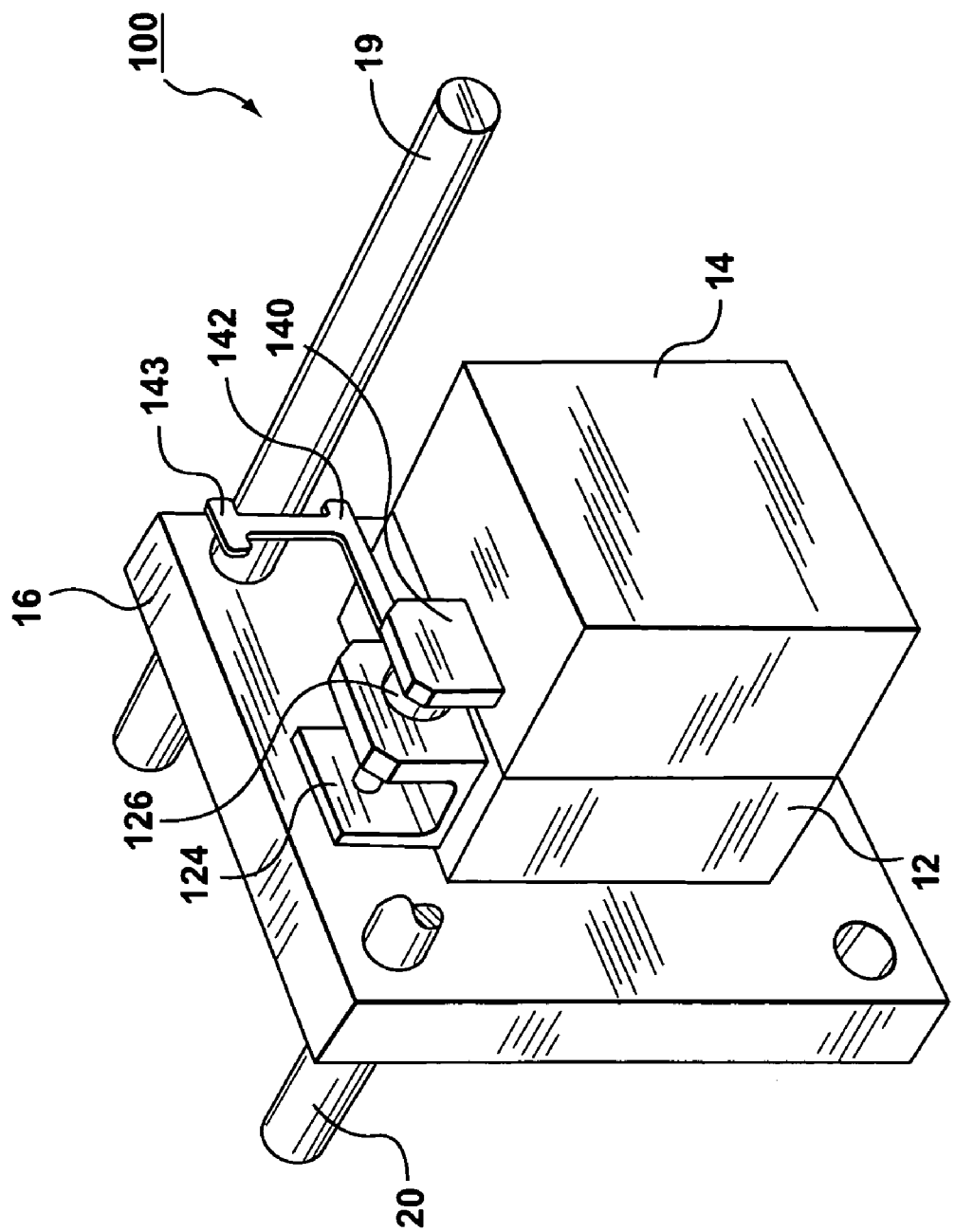
FIG. 3 is a perspective view of the AMA of FIG. 1 in a out-mold position.

FIG. 3 is the perspective view of the AMA 100 of FIG. 1 in the out-mold position. The arm 142 is shown in the out-mold position, in which the cylinder 136 is retracted (and is no longer visible) towards the frame 124 while being urged to continually abut against the frame 140. The arm 142 includes a material handling head 143 adapted to handle (that is, pick-up and release) the article. The head 143 includes suction cups or other article gripping and article releasing mechanisms.

With reference to FIG. 2 and FIG. 3, in operation, when the mold halves 12, 14 are translated towards each other from the mold-opened position to the mold-closed position, the frame 140 pushes against and urges the cylinder 136 to translate towards the frame 124 while continually abutting against the frame 140. As the cylinder 136 translates towards the frame 124, the cylinder 136 does not substantially rotate and the groove 137 is pushed back which forces the follower 135 to rotate as it follows the groove 137. Since the sleeve 126 is connected to the follower 135, the sleeve 126 responsively rotates the arm 142 from the in-mold portion to the out-mold position. Alternatively, the cylinder 136 may be rotated as the frame 140 pushes the cylinder 136 towards the frame 124 provided that the groove 137 and the follower 135 interact to rotate the sleeve 126.

Figure 4:
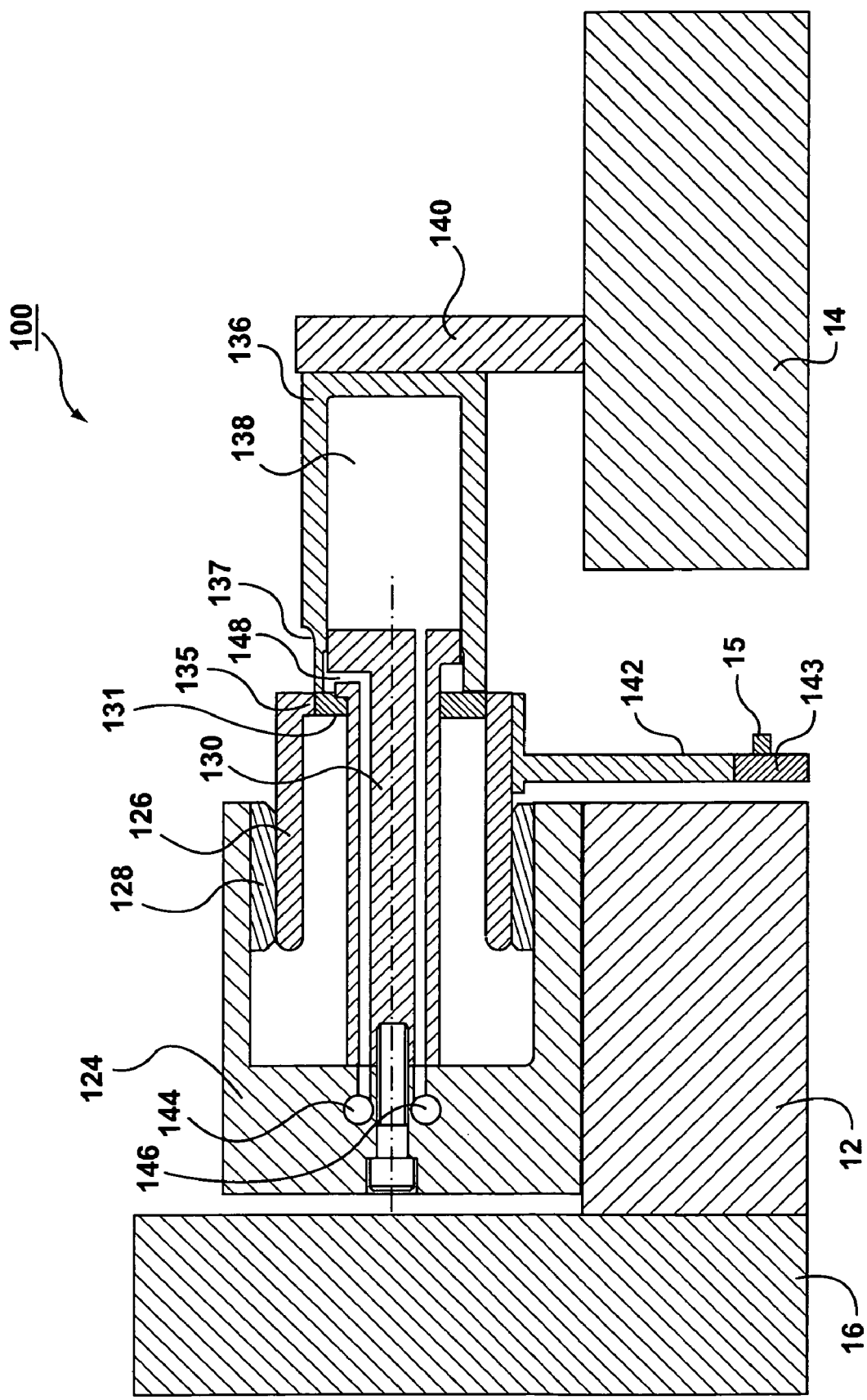
FIG. 4 is a cross sectional view of the AMA of FIG. 1 in the in-mold position.

FIG. 4 is the cross sectional view of the AMA 100 of FIG. 1 in the in-mold position. The cross section is taken along a longitudinal axis extending between the mold halves 12, 14 and through the AMA 100. The mold halves 12, 14 are in the mold-opened position.

The material handling head 143 is shown handling an article 15. A piston 130 is fixedly attached to the frame 124 and extends into the cylinder 136. The piston 130 is cooperatively slidable within the cylinder 136. A volume inside the cylinder 136 located in front of the piston 130 defines a fluid-holding chamber 138 that is configured to hold a compressible fluid therein, such as compressed air and the like. Another volume inside the cylinder 136 located between the piston 130 and the cover 131 defines another fluid-holding chamber 148. The piston 130 defines a maintenance-mode passageway 144 and also defines an operation-mode passageway 146 therein. The passageways 144, 146 may be connected directly to compressed air lines (not depicted). Alternatively, the compressed air lines may be connected to secondary air passageways defined in the frame 124, and these secondary passageways are connected to the passageways 144, 146.

Preferably, the cylinder 136 does not rotate relative to the frames 140, 124 but does linearly translate between the frames 124, 140. One approach for keeping the cylinder 136 non-rotatable is by configuring the piston 130 to have a square-shaped outer profile and the chamber 138 to have a square-shaped inner profile that mates with the profile of the piston 130 so that the chamber 138 may receive the piston 130 and the shape of the piston 130 prevents the cylinder from rotating.

When the passageway 146 becomes pressurized with compressed air and the passageway 144 becomes depressurized of compressed air, the chamber 138 becomes a synchronizing structure that is configured to synchronize a reciprocating movement of the arm 142 caused by the arm reciprocating structure with a lateral movement of the mold 12, 14 between the mold-opened position and the mold-closed position. The synchronizing structure maintains the arm reciprocating structure in an abutment relationship with the frame 140 (specifically, the cylinder 136, which is a part of the arm reciprocating structure, is maintained against the frame 140). When the passageway 146 becomes depressurized of compressed air, the chamber 138 becomes depressurized and the cylinder 136 is no longer urged against the frame 140.

When the passageway 144 becomes pressurized with compressed air and the passageway 146 becomes depressurized of compressed air, the chamber 148 becomes a de-synchronizing structure that is configured to de-synchronize the reciprocating movement of the arm 142 caused by the arm reciprocating structure from the lateral movement of the mold 12, 14 between the mold-opened position and the mold-closed position. Specifically, the compressed air in the chamber 148 will pull or retract the cylinder 136 away from the abutment relationship with the frame 140. One or more fluid pumping or moving mechanisms (not depicted) is attached to the passageway 146 and/or 144, and is configured to move the fluid in and out of the chambers 138 and 148 respectively.

The AMA 100 operates under an operation mode or a maintenance mode. In the operation mode, the AMA 100 is used to move articles into or out from the mold halves 12, 14. In the maintenance mode, the AMA 100 (specifically, the cylinder 136) is disengaged and retracted from the frame 140 so that an operator may then conveniently access any articles jammed in the mold halves 12, 14.

In the operation mode, a sufficient amount of compressed air is pumped into the operation-mode passageway 146 so that the chamber 138 becomes pressurized with compressed air. The amount of compressed air contained in the chamber 138 is sufficient enough so that when the mold halves 12, 14 move apart and back together again, the compressed air resiliently urges the cylinder 136 to remain in a resiliently abutting relationship with the frame 140. The maintenance-mode passageway 144 is not connected and pressurized with compressed air while the AMA 100 operates in the operation mode.

In the maintenance mode, compressible air is disconnected from the operation-mode passageway 146, which discharges compressed air from the chamber 138. Then compressible air is attached to and charges up the maintenance-mode passageway 144 and the chamber 148. The compressed air filled within the chamber 148 forces the cylinder 136 back towards the stationary mold half 12 thereby the cylinder 136 becomes retracted away from the moving mold half 14.

Figure 5:
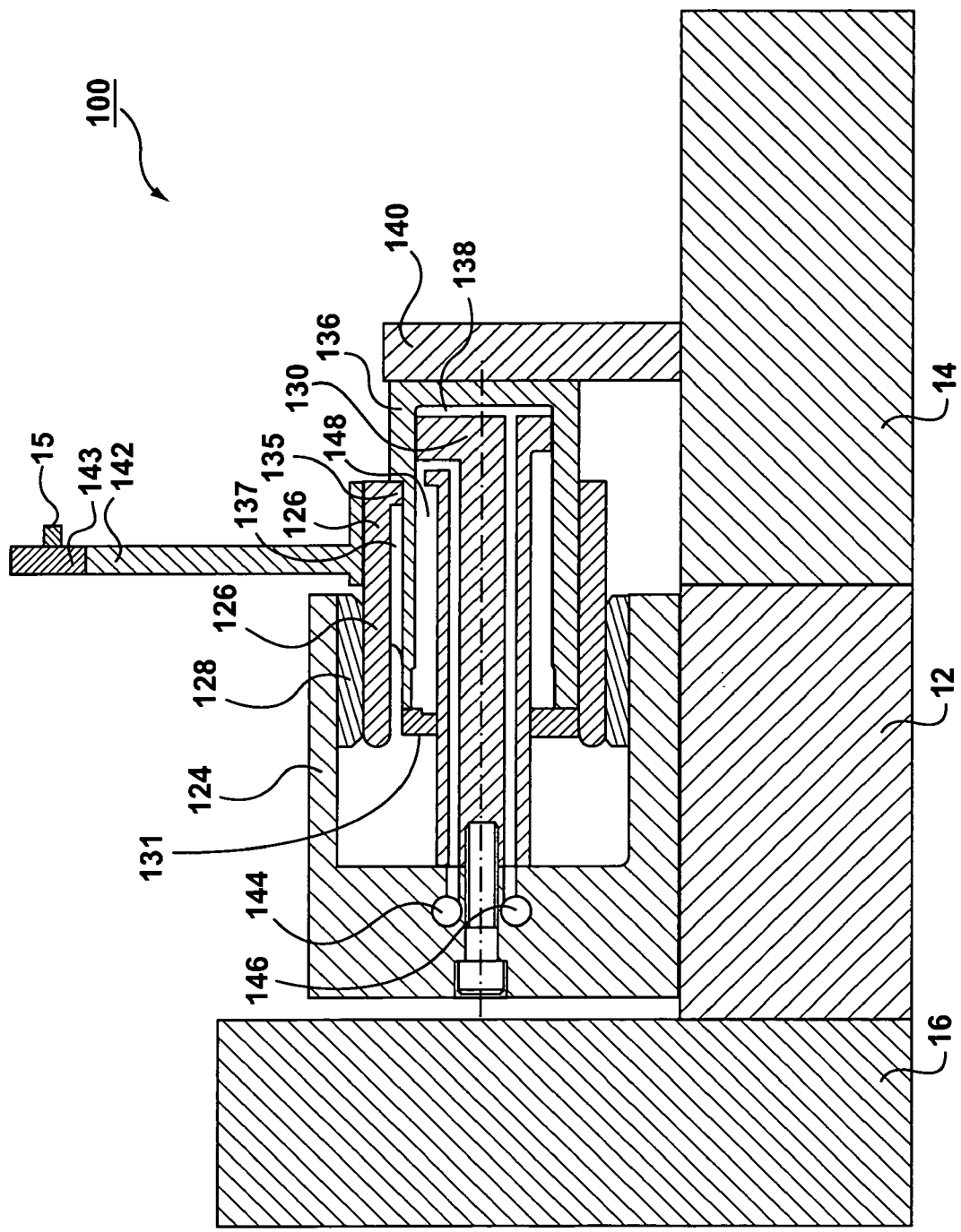
FIG. 5 is a cross sectional view of the AMA of FIG. 1 in the out-mold position.

FIG. 5 is the cross sectional view of the AMA 100 of FIG. 1 in the out-mold position. The AMA 100 is shown operating in the production mode. The mold halves 12, 14 are in the mold-closed position. By way of a clamping mechanism, the mold half 14 is moved over to abut against the mold half 12. As the mold half 14 moves towards the mold half 12, the frame 140 is made to urge and push against the cylinder 136. The passageway 146 remains pressurized so as to substantially prevent air from leaving the chamber 138 so that the cylinder 136 may then continue to be urged against and abut the frame 140. The passageway 144 remains un-pressurized sufficiently enough so as to not impede the biasing of the cylinder 136 towards the frame 140. Since the piston 130 is firmly attached to the frame 124, the cylinder 136 will slide over the piston 130 towards the frame 124, and the air contained in the chamber 138 becomes even more compressed. When the mold half 14 is moved away from the mold half 12, the compressed air contained in the chamber 138 urges the cylinder 136 to maintain abutting engagement with the frame 140. The follower 135 will follow the groove 137 as the cylinder 136 moves the groove 137 and the arm 142 responsively rotates from the out-mold position back to the in-mold position. A charge of compressed air is held during normal molding operation, and the charge of compressed air is selectively released so as to retract the cylinder 137 and move the arm 142.

Figure 6:
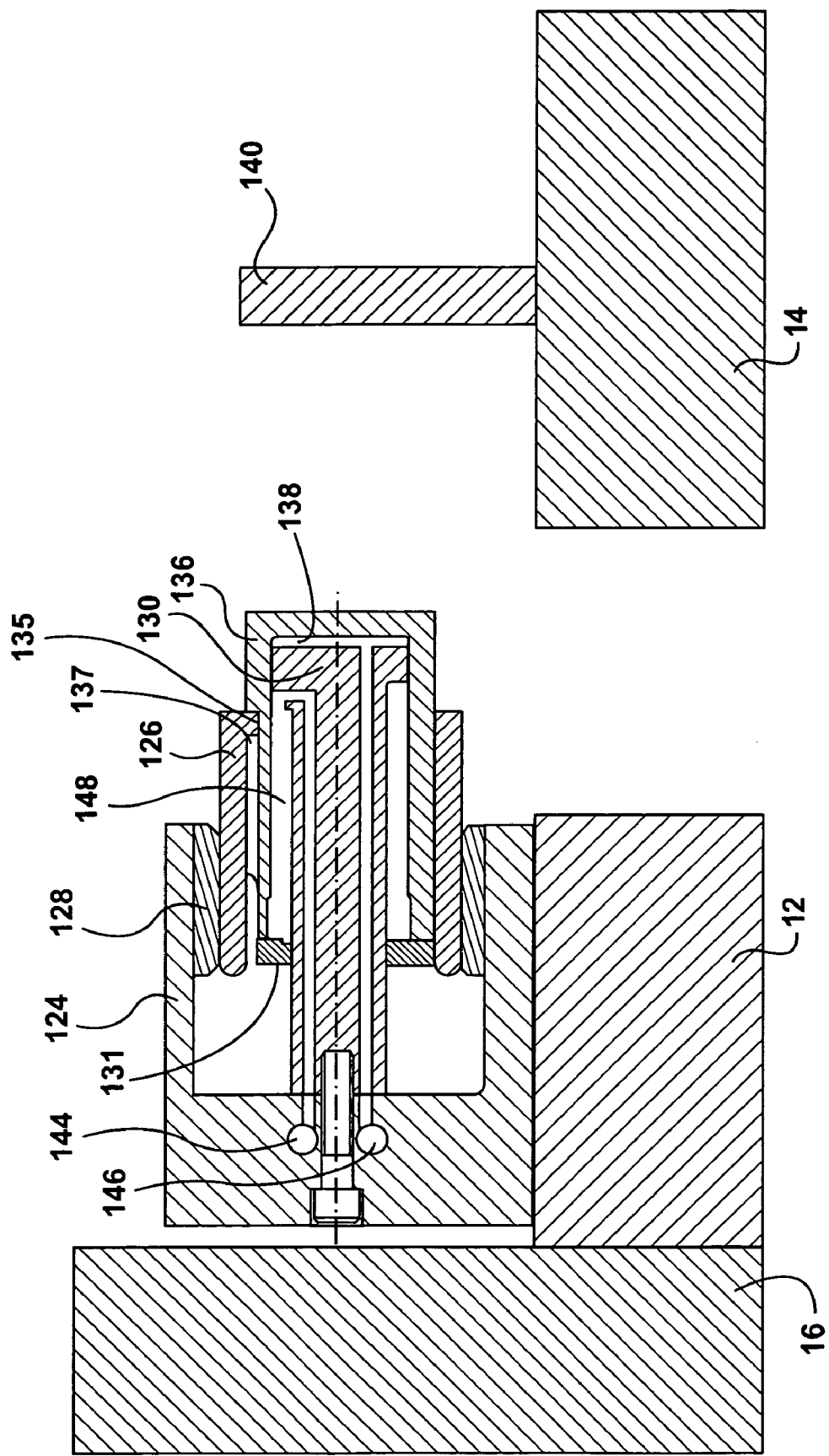
FIG. 6 is a cross sectional view of the AMA of FIG. 1 in a maintenance mode.

FIG. 6 is the cross sectional view of the AMA 100 of FIG. 1 in the maintenance mode. By valving compressed air into and out from the passageways 144, 146, the cylinder 136 can be retracted from its abutting relationship with the frame 140 so that the AMA 100 may be conveniently placed in the maintenance mode when an operator needs to remove an article that has been inadvertently jammed in the mold halves 12, 14. To manually retract the cylinder 136 away from the frame 140, air pressure connected to the passageway 146 is released or significantly reduced while air pressure connected to the passageway 144 is increased so that the air accumulating within chamber 148 may sufficiently retract the cylinder 136 away from the frame 140.

It will be appreciated that some elements may be adapted for specific conditions or functions. The concepts described above may be further extended to a variety of other applications that are clearly within the scope of the present invention. Having thus described the embodiments, it will be apparent to those skilled in the art that modifications and enhancements are possible without departing from the concepts as described. Therefore, what is intended to be protected by way of letters patent should be limited only by the scope of the following claims:

The invention claimed is:

1. An article moving apparatus configured to move an article relative to a first mold half and a second mold half of a molding machine, the article moving apparatus comprising:

an arm configured to grasp and release the article; and
an arm reciprocating structure configured to reciprocate the arm between an in-mold position and an out-mold position relative to the first mold half and the second mold half, and said arm reciprocating structure being further configured to:
abut against a mold half, and
be selectively retractable from abutment with said mold half to allow operator access to faces of said first mold half and said second mold half, wherein the arm reciprocating structure includes:
a synchronizing structure configured to synchronize a reciprocating movement of the arm caused by the arm reciprocating structure with a lateral movement of the first mold half and the second mold between a mold-opened position and a mold-closed position, and to maintain the arm reciprocating structure in an abutment relationship with any one of the second mold half and the first mold half.

2. The article moving apparatus of claim 1, wherein:
the arm reciprocating structure is configured to be substantially aligned along an opening and closing direction of the first mold half and the second mold half.

3. The article moving apparatus of claim 1, wherein:
the arm reciprocating structure further includes:
a desynchronizing structure configured to desynchronize the reciprocating movement of the arm caused by the arm reciprocating structure from the lateral movement of the first mold half and the second mold half between the mold-opened position and the mold-closed position, and to retract the arm reciprocating structure away from the abutment relationship with the first mold half and the second mold half.

4. The article moving apparatus of claim 1, wherein:
the arm reciprocating structure is configured to selectively retract and move the arm to a resting position located above the first mold half and the second mold half.

5. The article moving apparatus of claim 1, wherein:
the arm reciprocating structure is attached to a stationary platen of the molding machine.

6. The article moving apparatus of claim 1, wherein:
the arm reciprocating structure is configured to rotatably reciprocate the arm.

7. The article moving apparatus of claim 1, wherein:
the arm reciprocating structure is configured to abut against and to be detachably retractable from any one of the first mold half and the second mold half.

8. The article moving apparatus of claim 1, wherein:
the arm reciprocating structure includes:
a sleeve configured to be rotatably mounted to the first mold half, and to attach to the arm;
a cylinder configured to slide within the sleeve, and to detachably abut against the second mold half; and
a motion converter configured to convert a relative translational movement between the cylinder and the sleeve into a rotational movement of the sleeve.

9. The article moving apparatus of claim 8, wherein:
the motion converter includes:
a groove defined on an outer surface of the cylinder; and
a groove follower depending from the sleeve, said groove follower being configured to:
follow the groove responsive to the relative translational movement between the cylinder and the sleeve, and
convert the relative translational movement into a rotational motion of the sleeve.

10. The article moving apparatus of claim 9, wherein:
the groove is configured to helicoidally wrap around the outer surface of the cylinder.

11. The article moving apparatus of claim 8, wherein:
the cylinder defines a fluid-holding chamber therein, the fluid-holding chamber is configured to hold a compressible fluid therein, the compressible fluid is configured to urge the cylinder into an abutting relationship with any one of the second mold half and the first mold half.

12. The article moving apparatus of claim 8, further comprising:
a fluid mover configured to move a compressible fluid in and out of a fluid-holding chamber.

13. The article moving apparatus of claim 8, wherein:
the arm reciprocating structure further includes:
a piston configured to attach with any one of the second mold half and the first mold half, and to cooperate with a compressible fluid held in chamber.

14. The article moving apparatus of claim 13, wherein:
the piston and the cylinder are configured to be non-rotatable relative to each other.

15. The article moving apparatus of claim 13, wherein:
the piston is configured to have a square-shaped outer profile;
the chamber is configured to have a square-shaped inner profile;
the cylinder is configured to have a cylindrically-shaped outer surface; and
the sleeve is configured to define a cylindrically-shaped inner surface for receiving the cylinder therein.

16. The article moving apparatus of claim 1, wherein:
the arm, reciprocating structure is substantially operable within a footprint of the first mold half and the second mold half.

17. The article moving apparatus of claim 1, wherein:
the arm reciprocating structure is selectively retractable along a clamp axis of the molding machine.

18. The article moving apparatus of claim 1, wherein:
the first mold half is a stationary mold half; and
the second mold is a movable mold half.

19. A molding machine, comprising:
a first mold half;
a second mold half configured to cooperate with the first mold half; and
an article moving apparatus configured to move an article relative to the first mold half and the second mold half, including:
an arm configured to grasp and release the article; and
an arm reciprocating structure configured to reciprocate the arm between an in-mold position and an out-mold position relative to the first mold half and the second mold half, and further configured to:
abut against a mold half, and
be selectively retractable away from an abutment relationship relative to said mold half to allow operator access to faces of said first mold half and said second mold half,
wherein the arm reciprocating structure includes:
a synchronizing structure configured to synchronize a reciprocating movement of the arm caused by the arm reciprocating structure with a lateral movement of the first mold half and the second mold between a mold-opened position and a mold-closed position, and to maintain the arm reciprocating structure in the abutment relationship with any one of the second mold half and the first mold half.

20. The molding machine of claim 19, wherein:
the arm reciprocating structure is configured to be substantially aligned along an opening and closing direction of the first mold half and the second mold half.

21. The molding machine of claim 19, wherein:
the arm reciprocating structure further includes:

a desynchronizing structure configured to desynchronize the reciprocating movement of the arm caused by the arm reciprocating structure from the lateral movement of the first mold half and the second mold half between the mold-opened position and the mold-closed position, and to retract the arm reciprocating structure away from the abutment relationship with the first mold half and the second mold half.

22. The molding machine of claim 19, wherein:
the arm reciprocating structure is configured to selectively retract and move the arm to a resting position located above the first mold half and the second mold half.

23. The molding machine of claim 19, wherein:
the arm reciprocating structure is attached to a stationary platen of the molding machine.

24. The molding machine of claim 19, wherein:
the arm reciprocating structure is configured to rotatably reciprocate the arm.

25. The molding machine of claim 19, wherein:
the arm reciprocating structure includes:
  a sleeve configured to be rotatably mounted to the first mold half, and to attach to the arm;
  a cylinder configured to slide within the sleeve, and to detachably abut against the second mold half; and
  a motion converter configured to convert a relative translational movement between the cylinder and the sleeve into a rotational movement of the sleeve.

26. The molding machine of claim 25, wherein:
the motion converter includes:
  a groove defined on an outer surface of the cylinder; and
  a groove follower depending from the sleeve, said groove follower being configured to:
    follow the groove responsive to the relative translational movement between the cylinder and the sleeve, and
    convert the relative translational movement into a rotational motion of the sleeve.

27. The molding machine of claim 26, wherein:
the groove is configured to helicoidally wrap around the outer surface of the cylinder.

28. The molding machine of claim 25, wherein:
the cylinder defines a fluid-holding chamber therein, the fluid-holding chamber is configured to hold a compressible fluid therein, the compressible fluid is configured to urge the cylinder into an abutting relationship with any one of the second mold half and the first mold half.

29. The molding machine of claim 25, further comprising:
a fluid mover configured to move a compressible fluid in and out of a fluid-holding chamber.

30. The molding machine of claim 25, wherein:
the arm reciprocating structure further includes:
  a piston configured to attach with any one of the second mold half and the first mold half, and to cooperate with a compressible fluid held in chamber.

31. The molding machine of claim 30, wherein:
the piston and the cylinder are configured to be non-rotatable relative to each other.

32. The molding machine of claim 30, wherein:
the piston is configured to have a square-shaped outer profile;
the chamber is configured to have a square-shaped inner profile;
the cylinder is configured to have a cylindrically-shaped outer surface; and
the sleeve is configured to define a cylindrically-shaped inner surface for receiving the cylinder therein.

33. The molding machine of claim 19, wherein:
the arm reciprocating structure is substantially operable within a footprint of the first mold half and the second mold half.

34. The molding machine of claim 19, wherein:
the arm reciprocating structure is selectively retractable along a clamp axis of the molding machine.

35. The molding machine of claim 19, wherein:
the first mold half is a stationary mold half; and
the second mold is a movable mold half.

* * * * *